United States Patent
Nietling et al.

(10) Patent No.: US 10,381,615 B2
(45) Date of Patent: Aug. 13, 2019

(54) BATTERY MODULE WITH CELL FIXATION

(71) Applicant: Robert Bosch GmbH, Stuttgart (DE)

(72) Inventors: David Nietling, Metamora, MI (US); Christopher Matthew Millon, Grand Blanc, MI (US); David Brian Naughton, Oxford, MI (US)

(73) Assignee: Robert Bosch GmbH, Stuttgart (DE)

( * ) Notice: Subject to any disclaimer, the term of this patent is extended or adjusted under 35 U.S.C. 154(b) by 411 days.

(21) Appl. No.: 15/319,145

(22) PCT Filed: Jun. 19, 2015

(86) PCT No.: PCT/US2015/036640
§ 371 (c)(1),
(2) Date: Dec. 15, 2016

(87) PCT Pub. No.: WO2015/196046
PCT Pub. Date: Dec. 23, 2015

(65) Prior Publication Data
US 2017/0125756 A1    May 4, 2017

Related U.S. Application Data

(60) Provisional application No. 62/015,022, filed on Jun. 20, 2014.

(51) Int. Cl.
*H01M 2/10* (2006.01)
*H01M 10/653* (2014.01)
(Continued)

(52) U.S. Cl.
CPC ......... *H01M 2/1077* (2013.01); *H01M 10/04* (2013.01); *H01M 10/653* (2015.04); *H01M 10/6554* (2015.04); *H01M 2220/20* (2013.01)

(58) Field of Classification Search
None
See application file for complete search history.

(56) References Cited

U.S. PATENT DOCUMENTS

| | | |
|---|---|---|
| 6,933,076 B2 | 8/2005 | Ura et al. |
| 7,977,011 B2 | 7/2011 | Inagaki |
| (Continued) | | |

OTHER PUBLICATIONS

International Search Report corresponding to PCT Application No. PCT/US2015/036640, dated Aug. 25, 2015 (3 pages).

*Primary Examiner* — Wyatt P McConnell
(74) *Attorney, Agent, or Firm* — Maginot Moore & Beck LLP

(57) ABSTRACT

A battery module comprises an electrochemical cell including a first dielectric layer positioned on a first side of the cell, a first side plate in opposition to the first side, and a first adhesive layer positioned between the first side plate and the first side. The first dielectric layer defines a first window. The first adhesive layer is adhered to the first side plate and the first side through the first window. Another battery module comprises first and second cells, a base plate, a frame, and a first and second adhesive portion. The frame includes a beam positioned between the first cell and the second cell and is in engagement with a first side and a second side of the first and second cells, respectively. The first adhesive portion and the second adhesive portions are positioned between the base plate and the bottom surfaces of the cells.

20 Claims, 9 Drawing Sheets

(51) Int. Cl.
*H01M 10/6554* (2014.01)
*H01M 10/04* (2006.01)

(56) References Cited

U.S. PATENT DOCUMENTS

| | | |
|---|---|---|
| 2007/0154781 A1 | 7/2007 | Choi |
| 2009/0023057 A1* | 1/2009 | Kim .................... H01M 2/0207 429/120 |
| 2011/0117419 A1 | 5/2011 | Lee et al. |
| 2014/0050968 A1 | 2/2014 | Park |
| 2014/0255755 A1* | 9/2014 | Kwon ................. H01M 2/0212 429/149 |
| 2015/0311485 A1* | 10/2015 | Fister ................. H01M 2/1077 429/151 |

* cited by examiner

BATTERY MODULE WITH CELL FIXATION

CROSS REFERENCE

This application is a 35 U.S.C. § 371 National Stage Application of PCT/US2015/036640, filed Jun. 19, 2015, which claims the benefit of priority to U.S. Provisional Application No. 62/015,022 filed Jun. 20, 2014, the entire contents of both applications is herein incorporated by reference.

FIELD OF THE INVENTION

This disclosure relates generally to battery cells, and, more particularly, battery cells in battery modules and packs.

BACKGROUND

A battery is an energy storage device used to store and supply electrical energy, usually consisting of one or more electrochemical cells that convert stored chemical energy to electrical energy. A plurality of electrochemical cells are often stacked together side-by-side and electrically connected together in series or parallel to form a battery pack, or battery module. One or more battery modules can be secured on a pack base for installation on, for example, an electric or hybrid vehicle, allowing the vehicle to utilize the energy from the battery modules to power the vehicle's motor and other electrical systems.

Typically, the cells of a battery module are held together in a stack by a mechanical fixation assembly, sometimes referred to as a cage. The cage provides structural support to the cells with at least one metal restraint band conforming around a stack of cells. Portions of the metal restraint band are typically welded, riveted, or screwed together. The cage further include flanges through which threaded fasteners are installed to secure the cage and cells to a battery pack base.

The known mechanical fixation assembly has drawbacks. For example, assembling and welding the cage imposes burdensome costs on manufacturers. Furthermore, weight reduction on electric and hybrid vehicles is desirable to increase energy efficiency and range of the vehicles, and size reduction of batteries is also needed because space on the vehicles is at a premium. However, the metal bands of traditional cages increase the overall weight and size of the module. Additionally, battery cells expand and contract due to chemical reactions during cycling, and during expansion, stresses are applied by the cells at points of contact between the cells and the band, and at points of contact between each adjacent cell. Peak stresses concentrated at the points of contact may cause deformation, fracture and failure of the cell dielectric coating or casing, leading to short circuits or reduced performance and overall life of the cells. There is a need for another method of cell fixation.

SUMMARY

The disclosure provides for a battery module having cell fixation that provides many advantages. In one embodiment, a battery module comprise at least one electrochemical cell including a first side and a first dielectric layer positioned on the first side, the first dielectric layer defining a first window, a first side plate in opposition to the first side, and a first adhesive layer positioned between the first side plate and the first side, the first adhesive layer adhered to the first side plate and the first side through the first window.

In one embodiment, the module further comprises a second side plate, the at least one electrochemical cell including a second side and a second dielectric layer positioned on the second side, the second dielectric layer defining a second window, and a second adhesive layer positioned between the second side plate and the second side, the second adhesive layer adhered to the second side plate and the second side through the second window.

In another embodiment, the module comprises a base plate located beneath a first bottom surface of the at least one electrochemical cell, and a third adhesive layer positioned between the base plate and the first bottom surface, the third adhesive layer adhered to the base plate and the first bottom surface. Some embodiment include a first end plate, and a fourth adhesive layer positioned between the first end plate and a third side of the at least one electrochemical cell, the fourth adhesive layer adhered to the first end plate and the third side.

In particular embodiments, the at least one electrochemical cell includes a first electrochemical cell and a second electrochemical cell. In further embodiment, the module further comprises a fifth adhesive layer positioned between the first electrochemical cell and the second electrochemical cell, the fifth adhesive layer adhered to the first electrochemical cell and the second electrochemical cell. In certain embodiments, the module comprises a first end plate, a second end plate, a fourth adhesive layer positioned between the first end plate and a third side of the first electrochemical cell, the fourth adhesive layer adhered to the first end plate and the third side, and a sixth adhesive layer positioned between the second end plate and a fourth side of the second electrochemical cell, the sixth adhesive layer adhered to the second end plate and the fourth side.

In particular embodiments, the battery module further comprises a pack base, a seventh adhesive layer positioned between a first bottom surface of the first electrochemical cell and the pack base, the first adhesive layer adhered to the first bottom surface and the pack base, and a ninth adhesive layer positioned between a second bottom surface of the second electrochemical cell and the pack base, the second adhesive layer adhered to the second bottom surface and the pack base.

In another embodiment, the at least one electrochemical cell comprises a first electrochemical cell and a second electrochemical cell, the first electrochemical cell has a second side and a first bottom surface, and the second electrochemical cell has a third side and a second bottom surface, a base plate located beneath the first bottom surface and the second bottom surface, and the battery module further comprises: a frame including a first beam positioned between the first electrochemical cell and the second electrochemical cell and in engagement with the second side and the third side, a first adhesive portion positioned between the base plate and the first bottom surface, and a second adhesive portion positioned between the base plate and the second bottom surface.

In yet another embodiment, the first adhesive portion is separated from the second adhesive portion by the first beam. In particular embodiments, the frame comprises a second beam orthogonal to the first beam, a third beam opposite the second beam, and a fourth beam opposite the second beam, such that the first beam, the second beam, the third beam, and the fourth beam define an opening closely conforming to an outer perimeter of the first electrochemical cell, the first adhesive portion located within the opening.

In one embodiment, the frame further includes at least one first spacer configured to establish a first space between the first bottom surface and the base plate, and at least one second spacer configured to establish a second space between the second bottom surface and the base plate, the first adhesive portion is positioned in the first space, and the second adhesive portion is positioned in the second space. In some embodiments, prior to assembly of the battery module, the first adhesive portion comprises a first Y-shape at a first end portion, and a second Y-shape at a second end portion. In an embodiment, the first adhesive portion is configured as a single strip of adhesive prior to assembly of the battery module.

In another embodiment, the first bottom surface and the second bottom surface are each circular shaped, and the first adhesive portion and the second adhesive portion each have a star shape prior to assembly of the battery module.

An embodiment of a battery module comprises a first electrochemical cell including a first side and a first bottom surface, a second electrochemical cell including a second side and a second bottom surface, a base plate located beneath the first bottom surface and the second bottom surface, a frame including a beam positioned between the first electrochemical cell and the second electrochemical cell and in engagement with the first side and the second side, a first adhesive portion positioned between the base plate and the first bottom surface, and a second adhesive portion positioned between the base plate and the second bottom surface.

In yet another embodiment, the frame further includes at least one first spacer configured to establish a first space between the first bottom surface and the base plate, and at least one second spacer configured to establish a second space between the second bottom surface and the base plate, the first adhesive portion is positioned in the first space, and the second adhesive portion is positioned in the second space.

In a further embodiment, prior to assembly of the battery module, the first adhesive portion comprises a first Y-shape at a first end portion and a second Y-shape at a second end portion. In an embodiment, the first adhesive portion is configured as a single strip of adhesive prior to assembly of the battery module. In an additional embodiment, the first bottom surface and the second bottom surface are each circular shaped, and the first adhesive portion and the second adhesive portion each have a star shape prior to assembly of the battery module.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Figure 1:
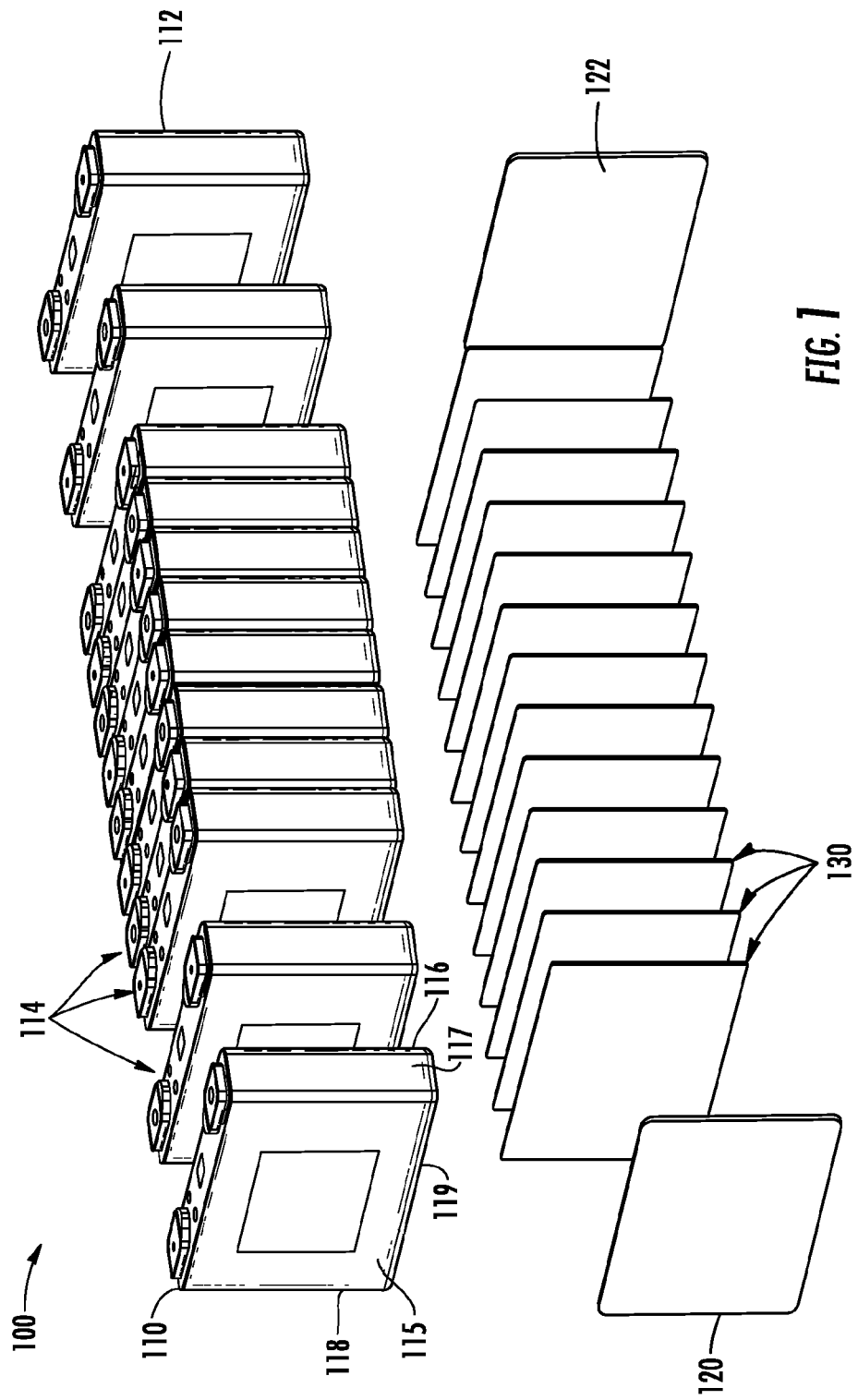
FIG. 1 shows a top perspective partially exploded view of a battery module with adhesive layers used to adhesively secure electrochemical cells to each other and to end plates.

FIG. 1 shows a top perspective partially exploded view of an embodiment of a battery module with cell fixation. A battery module 100 contains a plurality of electrochemical cells including interior cells 114 and end cells 110, 112. Each of the cells 110, 112, 114 define four side surfaces 115, 116, 117, 118, and a bottom surface 119. The interior cells 114 are arranged side by side and positioned between the end cells 110, 112, together forming a stack of cells. Each cell 110, 112, 114 in the stack is positioned with a side surface 115 or 116 in engagement with a side surface 115 or 116 of an adjacent cell 110, 112, 114. In one embodiment, battery module 100 contains a single cell. In another embodiment, the battery module 100 contains two end cells 110, 112 without any interior cells 114. In another embodiment, battery module 100 contains end cells 110, 112 with as many interior cells 114 as is desired.

At least one adhesive layer 130 is positioned between each adjacent cell 110, 112, 114 to adhesively secure each cell 110, 112 or 114 to an adjacent cell 110, 112 or 114. The battery module 100 further includes an end plate 120 in engagement with the end cell 110, and an end plate 122 in engagement with the end cell 112. An adhesive layer 130 is also positioned between the end plate 120 and the end cell 110 to adhesively secure the end plate 120 to the end cell 110, and between the end plate 122 and the cell 112 to secure the end plate 122 to the end cell 112. End plates 120, 122 are preferably formed of non-conductive material such as Fiber Reinforced Plastic, but can be another structural material capable of providing structural support to the module, such as aluminum, steel, fiberglass, steel mesh, KEVLAR®, carbon, plastic, or any other desired material. Alternatively, end plates 120, 122 comprise reinforcing fibers, wherein the fibers are imbedded in the adhesive. In some embodiments, the module 100 is positioned on a pack base (not shown).

The adhesive layers 130 can be glue, epoxy, polyurethane, adhesive tape, polymer, or any other desired adhesive. The adhesive layers 130 between the cells 110, 112, 114, and between end plates 120, 122 and the end cells 110, 112 provide a structural bond between each of the cells and between the cells and the end plates. The adhesive layers 130 and end plates 120, 122 thereby structurally stabilize the module, prevent the cells from sliding relative to each other, and confer additional benefits. For example, in the embodiment of FIG. 1, expansion forces applied by the cells during cycling are spread over the entire area covered by the glue between adjacent cells, or a cell and end plate. The area of contact of the adhesive layers 130 and the end plates 120, 122 with the side surfaces 115 or 116 of the end cells 110, 112 is larger than the area of contact between the cells and bands of traditional cages. As such, expansion forces are spread over a larger area due to the adhesive layers 130 as compared to cells positioned in a traditional cage, so peak stresses are lower. Lower peak stresses decrease the likelihood that a cell isolation or casing will fracture, deform or otherwise fail, which prevents electrical shorts and encourages improved cell life and performance.

Furthermore, the module 100 is composed of less material than typical modules that include bands of the traditional cage that encompass the entirety of the cell stack. Less material yields not only lower material costs, but also a lighter battery module that occupies less space. Securing the cells and plates together with adhesive further eliminates the need to weld components together, as is required for a traditional cage. Applying an adhesive is less expensive and less time consuming than welding, so reduction in manufacturing cost and manufacturing time may be realized compared to traditional modules. In contrast to welding operations, adhesives do not leave behind conductive particles, which can cause isolation failures and cause scrap or field failures.

Moreover, in some embodiments, the adhesive layers aid in cooling the cells. In such embodiments, the particular adhesive selected includes desirable thermal conductivity properties in order to dissipate heat from the cells to cool the cells. In certain embodiments, the adhesive layer comprises Epoxy 104-79 with values of thermal conductivity between approximately 1.2-1.6 W/mK. In some particular embodiments, the adhesive layer comprises Betamate 2098 with values of thermal conductivity between approximately 1.2-1.8 W/mK. In some embodiments, the adhesive has thermal conductivity between 1-2.5 W/mK. In yet further embodiments, the adhesive layer has a thermal conductivity between 1.0 and 2 W/mK.

In one embodiment, a cooling plate is placed adjacent the side plates to dissipate heat produced by the cells. In some embodiments, during cell expansion, a greater surface area of each cell is in thermal contact with an adjacent cell via the adhesive layer, as compared to a traditional cage without an adhesive layer. Thus, there is greater thermal contact between the cells. In other embodiments, the adhesive is selected to provide electrical isolation of the battery cells. In some embodiments, the adhesive is selected to provide dielectric protection to the cells.

Figure 2:
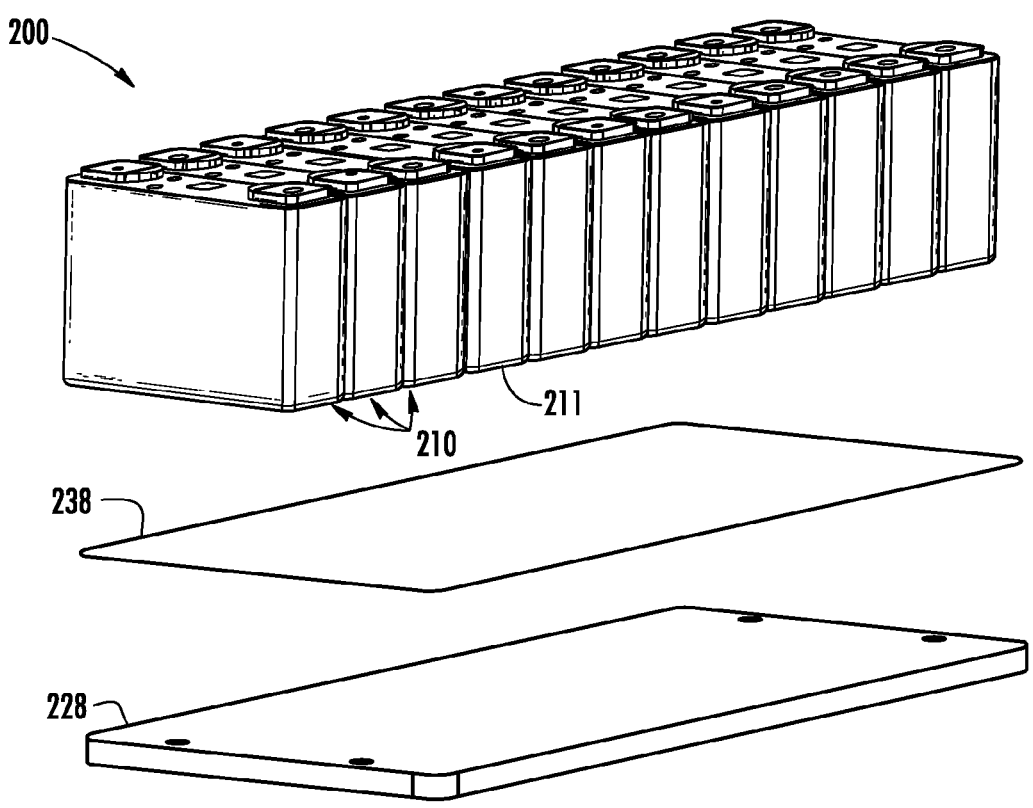
FIG. 2 shows a top perspective partially exploded view of a battery module with an adhesive layer used to adhesively secure the electrochemical cells to a base plate.

FIG. 2 shows a top perspective partially exploded view of an embodiment of a battery module with cell fixation. A battery module 200 has a plurality of cells 210 that may be similar to the cells of module 100. Each of the cells 210 defines a bottom surface 211. An adhesive layer 238 is positioned between the bottom surface 211 of each cell 210 and the base plate 228 to adhesively secure each cell 210 to the base plate 228. In one embodiment, the base plate 228 is the same material as the end plates 120, 122. In another embodiment, the cells 210 are secured to each other with an adhesive layer in the same manner as described for cells 110, 112, 114. In yet another embodiment, the cells 210 are not secured to each other with an adhesive layer. In one embodiment, the base plate 238 is a cooling plate that dissipates heat from the cells. In some embodiments, the module 200 is positioned on a pack base (not shown).

The adhesive layer 238 provides a structural bond between the cells and the base plate 228. The base plate 228 and the adhesive layer 238 thereby structurally stabilize the module. In some embodiments of the module 200, the same benefits over traditional fixation methods are experienced as discussed in connection with the embodiments described for module 100. In some embodiments, the adhesive layer is thermally conductive in order to help dissipate heat from the cells.

Figure 3:
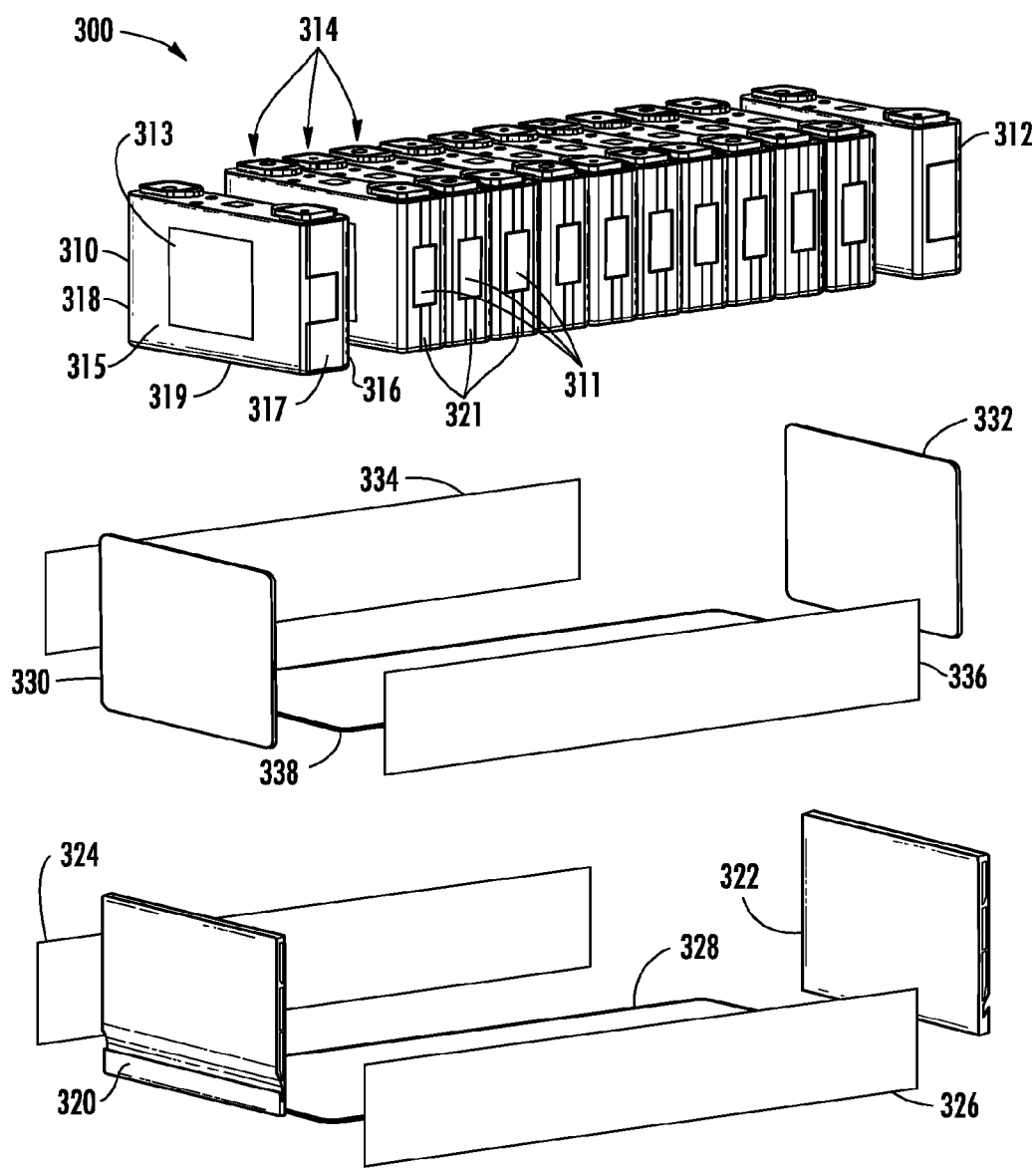
FIG. 3 shows a top perspective partially exploded view of a battery module with cells each having a dielectric layer along the side of each cell with a window, and an adhesive layer used to adhesively secure the electrochemical cells to end plates, side plates and a base plate.

FIG. 3 shows a top perspective partially exploded view of an embodiment of a battery module 300 with cell fixation. The battery module 300 contains a plurality of interior cells 314 arranged side by side and positioned between end cells 310, 312, together forming a stack of cells. Each of the cells 310, 312, 314 defines four side surfaces 315, 316, 317, 318, and a bottom surface 319.

The battery module 300 further includes an end plate 320 supported an end cell 310, an end plate 322 supporting the end cell 312, a side plate 324 supporting the side surface 318 of each of the cells 310, 312, 314, a side plate 326 supporting the side surface 317 of each of the cells 310, 312, 314, and a base plate 328 supporting the bottom surface 319 of each of the cells 310, 312, 314.

Each of the cells 310, 312, 314 also include a respective dielectric layer 321 positioned between the respective side surface 317 of each cell 310, 312, 314 and the side plate 326, and a dielectric layer (not shown) positioned between the respective side surface 318 of each cell 310, 312, 314 and the side plate 324. The dielectric layers are configured to electrically insulate the battery cells 310, 312, 314, and each includes an opening or window 311 through the entire cross section of each dielectric layer as shown in FIG. 3. Moreover, an adhesive layer 334 is positioned between the side plate 324 and the side surface 318 of each of the cells 310, 312, 314 to adhesively secure the side plate 324 to the cells 310, 312, 314, and an adhesive layer 336 is positioned between the side plate 326 and the side surface 316 of each of the cells 310, 312, 314 to adhesively secure the side plate 326 to the cells 310, 312, 314. The windows 311 of the respective dielectric layers 321 provides an open space between the battery cells 310, 312, 314 and the corresponding side plates 324, 326 to enable the adhesive layers 334, 336 to directly engage the side surfaces 317, 318 of the cells 310, 312, 314 and the side plates 324, 326 in order to ensure favorable adhesion between the side surfaces 317, 318 of the cells 310, 312, 314 and the respective side plates 324, 326. In this manner, the side plates 324, 326 are secured directly to the cells 310, 312, 314 via the adhesive layers 334, 336 through the windows 311 of the dielectric layers 321.

While FIG. 3 shows the windows 311 having a generally rectangular shape, any desired shape and size window may be utilized that ensures sufficient adhesion of the side plates 334, 336 and the side surfaces 317, 318 of the cells 310, 312, 314 via the windows 311 while also providing sufficient dielectric protection of the cells 310, 312, 314. Moreover, in some embodiments there are more than one window were side surface, and in other embodiments, the window spreads across the side surface of several cells. In one embodiment, the dielectric layers are a dielectric tape. However, any desired dielectric layer may be used.

An adhesive layer 330 is also positioned between the end cell 310 and the end plate 320 to adhesively secure the end plate 320 to the cell 310. Likewise, an adhesive layer 332 is positioned between the end cell 312 and the end plate 322 to adhesively secure the end plate 322 to the end cell 312. An adhesive layer 338 is positioned between the base plate 328 and the bottom surface 319 of each of the cells 310, 312, 314 to adhesively secure the base plate 328 to the cells 310, 312, 314.

In one embodiment, the end plates 320, 322, the side plates 324, 326 and the base plate 328 are formed with metal such as steel, but another structural material may be used, such as aluminum, fiberglass, steel mesh, Kevlar, carbon, or any other desired material, such as glass tape in resin. The base plate 328 may be a cooling plate to help dissipate heat from the cells. In some embodiments, the module 300 is positioned on a pack base (not shown), or the base plate is replaced by a pack base. The plates 324, 326 in some embodiments may be referred to as reinforcements. In particular embodiments, the reinforcements are steel, aluminum, or fiber reinforced plastics. In other embodiments, the reinforcements comprise an adhesive resin with embedded fibers, or any other desired reinforcement.

The adhesive layers 330, 332, 334, 336, 338 provide a structural bond between the cells and the end plates 320, 322, side plates 324, 326, and the base plate 328. In some embodiments, the adhesive layer is thermally conductive in order to help dissipate heat from the cells. The end plates 320, 322, side plates 324, 326, and the base plate 328 with adhesive layers 330, 332, 334, 336, 338 structurally stabilize the module. In some embodiments of the module 300, the same benefits over traditional fixation methods are experienced as discussed in connection with the embodiments associated with module 100 and 200. Additionally, in some embodiments, end plates 320, 322, side plates 324, 326 and base plate 328 of module 300 provide more structural support than an embodiment with only side plates, such as module 100, and a module with only a base plate, such as module 200.

In certain embodiments, the battery module has any desired combination of end plates, side plates, and base plates. For example, in one embodiment, the module only has end plates. In another embodiment, end plates, and a base plate, but not side plates are used. In another embodiment, the module only has a base plate and side plates.

Furthermore, although the embodiments of FIGS. 1-3 show the end plates, the side plates, and/or the base plate each formed as single plates, in some embodiments, each plate comprises one or more sub-plates placed adjacent to each other. In other embodiments, each of the plates is dimensioned and shaped to cover all of the cells. In still other embodiments, each of the plates is dimensioned and shaped to cover less than all of the cells. Side plates, base plates and end plates can be connected to the cells only by adhesive. Alternatively, or in addition, the one or more of the side plates, base plates and end plates can be connected to each other by, for example, welding or by one or more fasteners.

In some embodiments, an adhesive is positioned between the cells. In other embodiments, the adhesive is positioned between the cells and at least one of the end plates, side plates, and base plate. In other embodiments, an adhesive is positioned between only certain cells. In still other embodiments, an adhesive is positioned between all cells. Some embodiments have adhesive applied at all "contact" points between the cells and between the cells and at least one of the end plates, side plates, and base plate. Other embodiments have adhesive applied only to certain points of "contact" between the cells and at least one of the end plates, side plates, and base plate.

Figure 4:
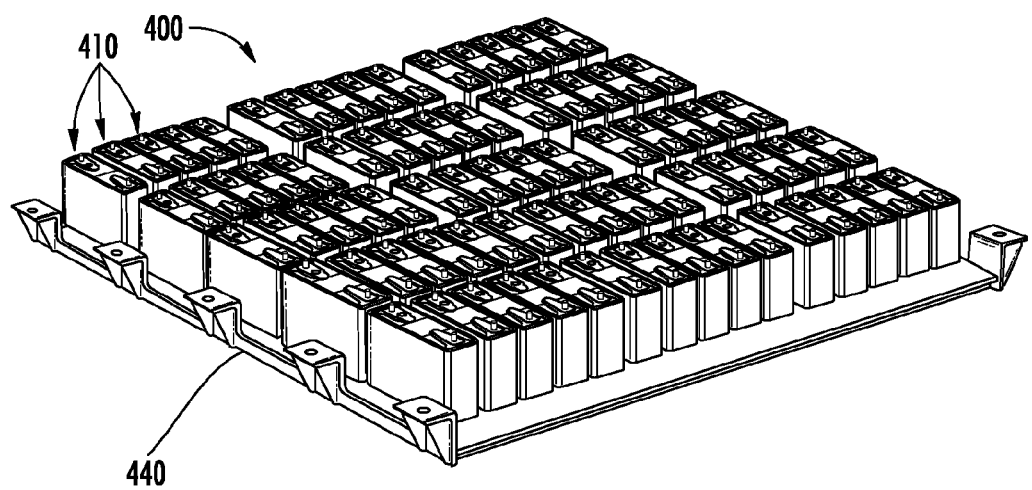
FIG. 4 shows a top perspective view of a battery module with adhesive layers used to adhesively secure the electrochemical cells to a pack base.
Figure 5:
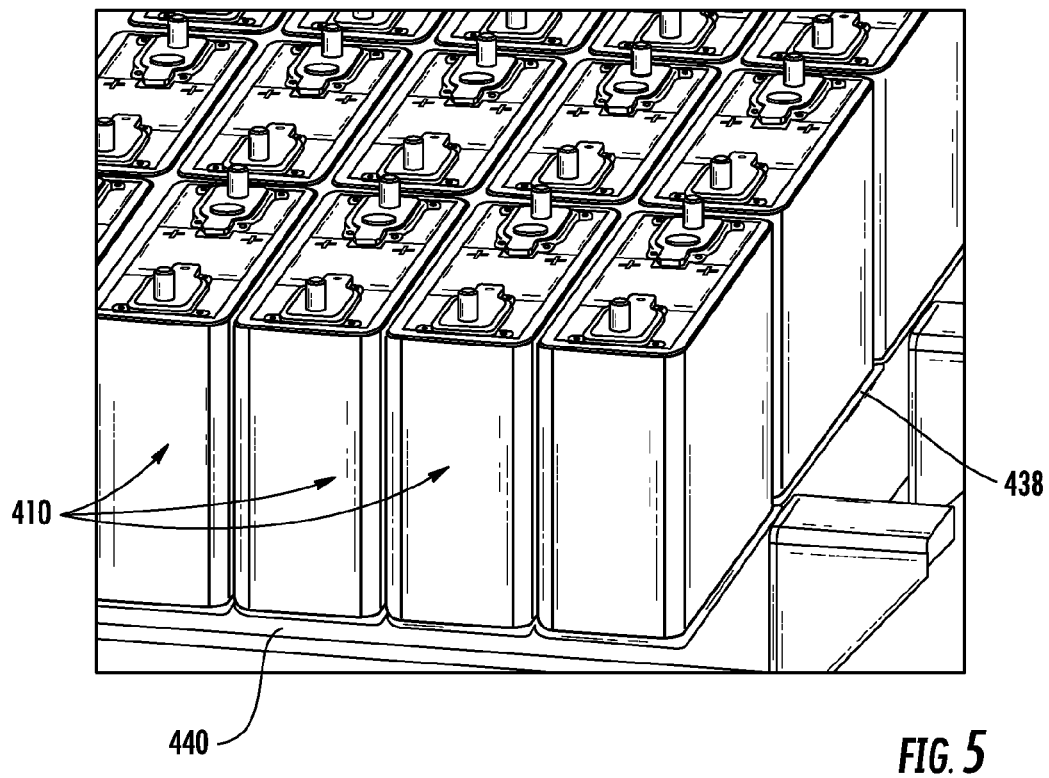
FIG. 5 shows a partial top perspective view of the battery module of FIG. 4 in detail.
Figure 6:
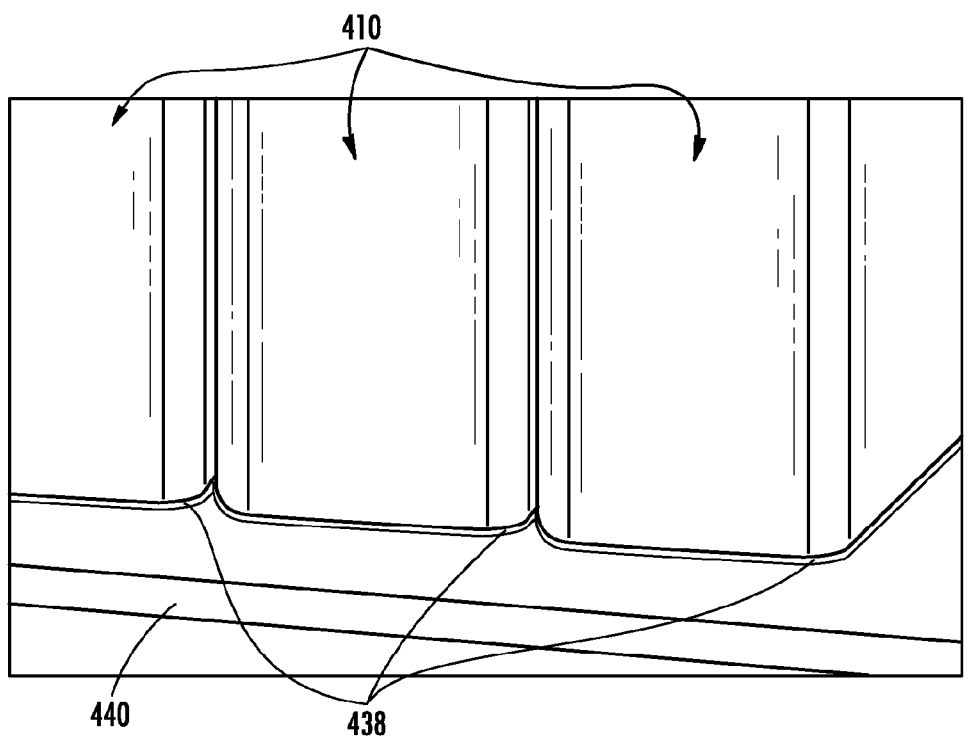
FIG. 6 shows a partial perspective view of the battery module of FIG. 4 in further detail.

Another embodiment of a battery module with cell fixation is shown in FIGS. 4-6. A battery module 400 includes a plurality of cells 410 and a pack base 440. As best shown in FIGS. 5-6, an adhesive layer 438 is positioned between a bottom surface of each cell 410 and the pack base 440 to adhesively secure the cells 410 to the pack base 440. The cells structurally support each other because the cells are stacked adjacent one another, and are further structurally supported by the adhesive layer 438 positioned between the bottom surface of the cells and the pack base 440. With the adhesive layer 438 positioned between the base of the cells and the pack base, the same or similar benefits over traditional fixation methods are experienced as discussed in connection with the embodiments associated with battery modules 100, 200 and 300. Additionally, less material is used since the embodiment shown in FIG. 4-6 lacks end plates, side plates, or a base plate. In some embodiments, the adhesive layer is thermally conductive in order to help dissipate heat from the cells.

Figure 7:
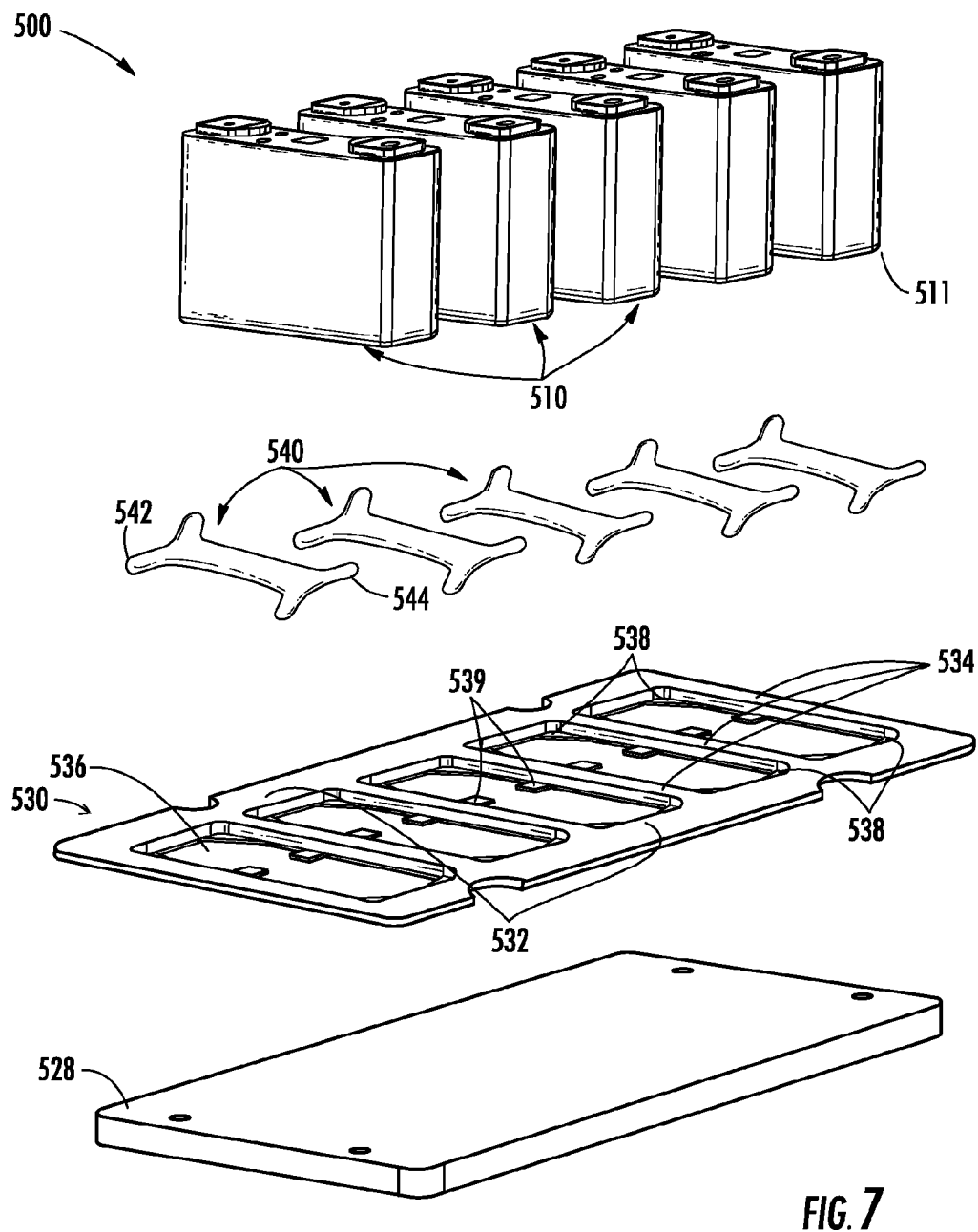
FIG. 7 shows a top perspective partially exploded view of a battery module with a plurality of cells, a base plate, a frame, and layers of Y-shaped adhesive layers used to adhesively secure the cells to the base plate.

Although FIGS. 4-6 show the cells adhesively secured to the pack base without end plates, side plates or a base plate, in other embodiments the previously described modules or cells are secured to the pack base with an adhesive layer. For example, in one embodiment the cells 110, 112, 114 of module 100 are further secured to the pack base 440 with an adhesive layer 438. In another embodiment, base plate 228 of module 200 or base plate 328 of module 300 is further secured to the pack base 440 with an adhesive layer 438. In other embodiments, a module having any desired combination of side plates, end plates, and/or base plates is further secured to the pack base with adhesive. FIG. 7 shows a top perspective partially exploded view of another embodiment of a battery module with cell fixation. A battery module 500 includes a base plate 528, a frame 530, a number of adhesive portions 540, and a plurality of cells 510 that may be similar to the cells of module 100.

The frame 530 is positioned on the base plate 528 and includes a number of longitudinal beams 532 and a number of cross-beams 534 oriented orthogonal to the number of longitudinal beams 532. A number of openings or windows 536 are defined in the frame 530. In the embodiment shown, each window 536 is four-sided with a pair of longitudinal beams 532 forming an opposite two of the four sides, and a pair of cross-beams 534 forming another opposite two of the four sides. The windows 536 are sized and shaped to correspond to the shape of an outer perimeter of the cells 510. When installed, the cells 510 are positioned within the windows 536 with outer perimeter of each cell 510 engage an inner surface of opposite longitudinal beams 532 and cross-beams 534. By engagement with side surfaces of each cell 510, the cross-beams 534 of the frame 530 ensure that a horizontal gap or space persists between each cell 510 even when the cells expand during cell cycling. The space helps reduce stresses acting on the side surfaces of cells compared to embodiments without the frame 530, and establishes space between the cells for air to circulate to assist in cooling the cells.

The frame 530 also includes four corner spacers 538 extending from the corners of each frame 530 within each window 536, and a pair of side spacers 539 extending from the cross-beams 534 within each window 536. The corners spacers 538 and the side spacers 539 are configured to space cells 510 from the base plate 528 in a vertical direction. As used herein, the term spacer is understood to mean any element of the frame, such as the frame 530, that vertically spaces an electrochemical cell, such as an electrochemical cell 510, from a base plate, such as the base plate 528 of the embodiment shown in FIG. 7.

Prior to installing the cells 510, each of the number of adhesive portions 540 are positioned within a respective window 536. As shown in FIG. 7, the adhesive portions 540 each have a double "Y" shape including a first Y 542 and a second Y 544 prior to installation of the cells 510.

After the cells 510 are installed within the windows 536 of the frame 530, the cell 510 reach rest on the four corner spacers 538 and side spacers 539 within a respective window 536. The bottom surface 511 of each cell 510 is supported in engagement with the four corner spacers 538 and side spacers 539 within each respective window 536. Portions of each bottom surface 511 not in engagement with one of the corner spacers 538 or side spacers 539 engage a respective adhesive portion 540, thereby spreading the adhesive portion 540 evenly between each bottom surface 511 and the base plate within the each window 536 when the cell is pressed firmly towards the base plate 528 during installation. After spreading, the adhesive portions 540 adhere to each bottom surface 511 not in engagement with the corner spacers 538 or side spacers 539 and to the base plate 528 to adhesively secure each cell 510 to the base plate 528 through a respective window 536.

As noted above, the four corner spacers 538 and side spacers 539 elevate the cells 510 from the base plate 528 to establish a space for the adhesive layer 540 to spread evenly between the bottom surfaces 511 of the cells 510 and the base plate 528. Compared to embodiments without the frame 530 in which adhesive layers between the bottom surface of the cells and the base plate may be forced out from underneath the cells when the cells are pressed firmly against the base plate, the space created between the bottom surfaces 511 of the cells 510 and the base plate 528 due to the corner spacers 538 and side spacers 539 of the frame 536 allow sufficient room for the adhesive layer 540 to spread homogenously beneath the bottom surfaces 511 within the windows 536. The adhesive is not fully forced or spread out beyond the extents of the bottom surfaces 511 of the cells 510 when the cells 510 are installed on the base plate 528. Homogenous spreading of adhesive contributes to a more uniform mechanical behavior of the cells with respect to the base plate during cell cycling.

As mentioned, in the embodiment shown, the adhesive portions 540 each have a double "Y" shape including a first Y 542 and a second Y 544 prior to installation of the cells 510 within the windows 536 of the frame 530. The Y-shape of the adhesive portions 540 further assists in homogenous spreading of the adhesive 540 when the cells are installed by reducing or eliminating areas or pockets of air between the bottom surface 511 of the cells, the base plate 528, and the adhesive portions 540, including homogenous spreading into the corners of the windows 536. As discussed above, homogenous spreading of adhesive contributes to a more uniform mechanical behavior of the cells with respect to the base plate during cell cycling.

Figure 8:
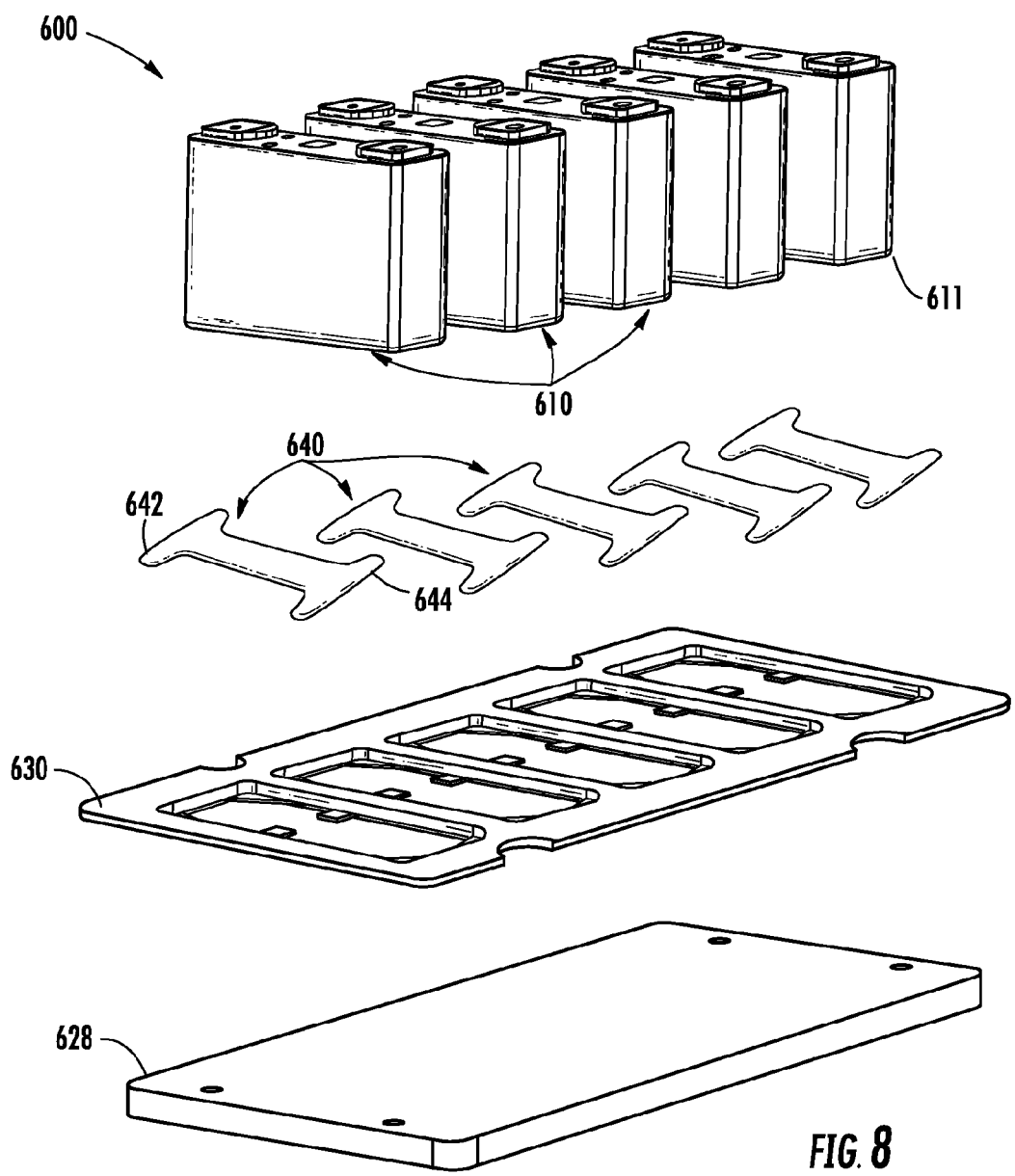
FIG. 8 shows a top perspective partially exploded view of a battery module with a plurality of cells, a base plate, a frame, and layers of adhesive having an I-shape.

While the adhesive portions 540 are shown with a double Y-shape, other shapes are possible. In one embodiment shown in FIG. 8, a battery module 600 includes a plurality of double-T shaped adhesive portions 640 that adhesively secure a plurality of cells 610 positioned in a frame 630 to a base plate 628. The cells 610, frame 630 and base plate 628 are substantially similar to those of the battery module 500. The double T-shape of the adhesive portions 640 can also provide homogenous spreading of the adhesive.

Figure 9:
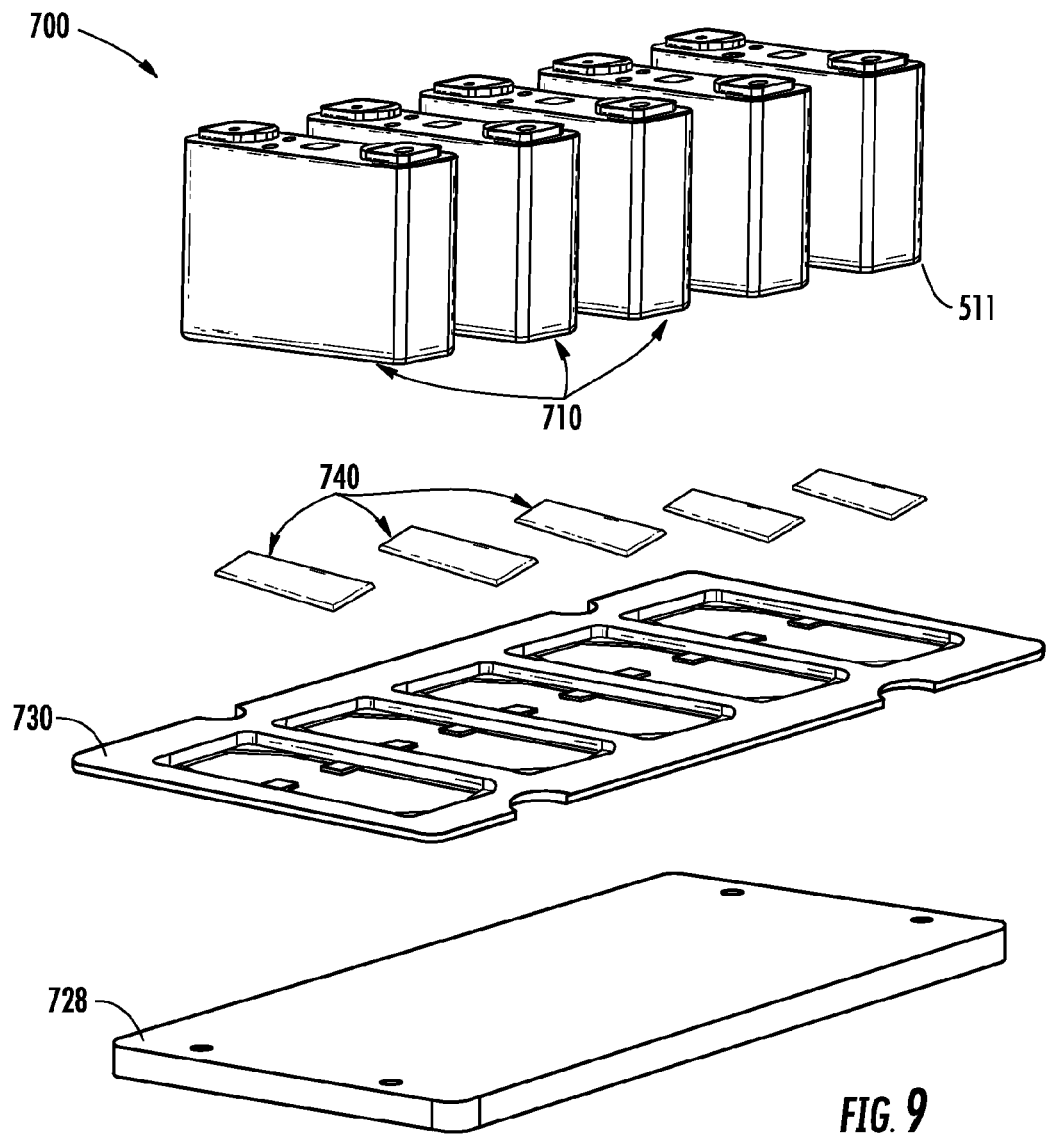
FIG. 9 shows a top perspective partially exploded view of a battery module with a plurality of cells, a base plate, a frame, and layers of adhesive having a narrow, rectangular shaped bottom surface with an adhesive layer shaped as a narrow strip.

FIG. 9 shows another embodiment in which a battery module 700 includes a number of I-shaped layers of adhesive 740 that adhesively secure a plurality of cells 710 positioned in a frame 730 to a base plate 728. The cells 610, frame 630 and base plate 628 are substantially similar to those of the battery module 500. This particular embodiment helps facilitate homogenous spreading to secure a cell 710 having a relatively narrow, rectangular-shaped bottom surface with a high aspect ratio to a base plate 728.

Figure 10:
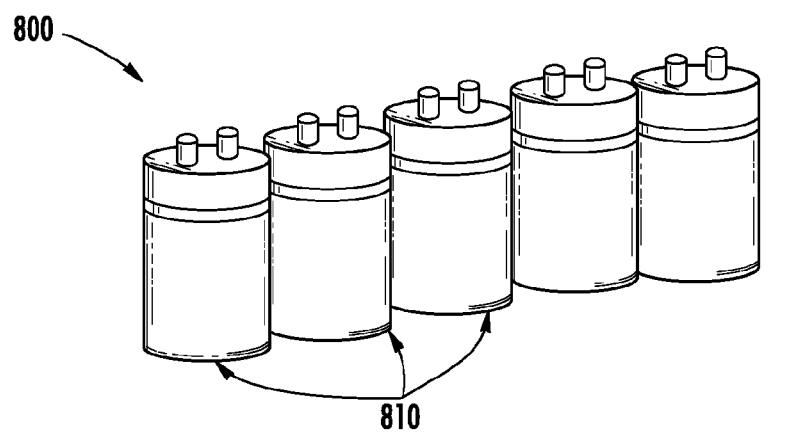
FIG. 10 shows a top perspective partially exploded view of a battery module with a plurality of cylindrically-shaped cells, a base plate, a frame, and layers of adhesive having a star-shape.
Figure 10:
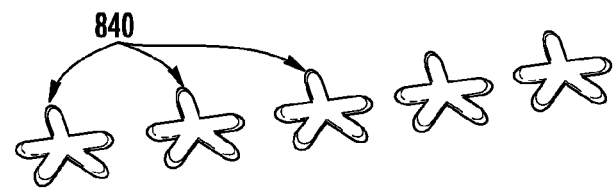
Figure 10:
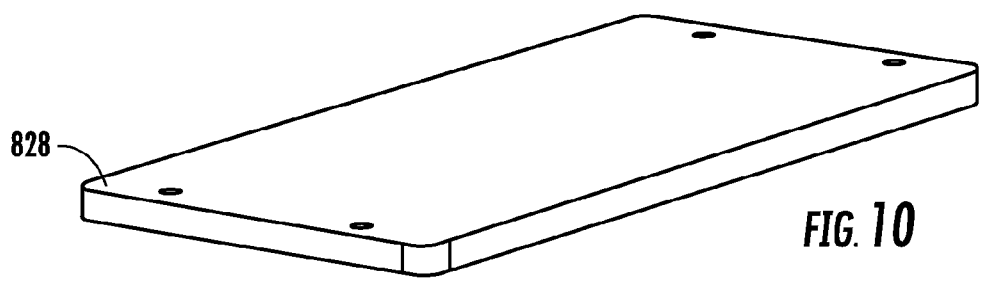

In yet another embodiment shown in FIG. 10, a battery module 800 includes a number of layers of adhesive 840 each having a star-shape provides homogenous spreading when a cell 810 having a circular bottom surface is secured to a base plate 828. Any desired shape may be utilized depending on the shape of the cell to facilitate even spreading.

In addition, while frames 530, 630 and 730 have been described for the embodiments of battery module 500, 600 and 700, a frame may be utilized with other embodiments as well. For example, the frame 530 may be utilized with the embodiment of battery modules 100, 200, 300. Moreover, a frame having circular beams may be utilized with the battery module 800 with cylindrical cells 810. A frame may include beams to correspond to cells having any desired shape.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the foregoing disclosure.

We claim:

1. A battery module, comprising:
   at least one electrochemical cell including a first side and a first dielectric layer positioned on the first side, the first dielectric layer defining a first window;
   a first side plate in opposition to the first side; and
   a first adhesive layer positioned between the first side plate and the first side, the first adhesive layer adhered to the first side plate and the first side through the first window.

2. The battery module of claim 1, further comprising:
   a second side plate, the at least one electrochemical cell including a second side and a second dielectric layer positioned on the second side, the second dielectric layer defining a second window; and
   a second adhesive layer positioned between the second side plate and the second side, the second adhesive layer adhered to the second side plate and the second side through the second window.

3. The battery module of claim 2, further comprising:
   a base plate located beneath a first bottom surface of the at least one electrochemical cell; and
   a third adhesive layer positioned between the base plate and the first bottom surface, the third adhesive layer adhered to the base plate and the first bottom surface.

4. The battery module of claim 3, further comprising:
   a first end plate; and
   a fourth adhesive layer positioned between the first end plate and a third side of the at least one electrochemical cell, the fourth adhesive layer adhered to the first end plate and the third side.

5. The battery module of claim 1, wherein:
   the at least one electrochemical cell includes a first electrochemical cell and a second electrochemical cell.

6. The battery module of claim 5, further comprising:
   a fifth adhesive layer positioned between the first electrochemical cell and the second electrochemical cell, the fifth adhesive layer adhered to the first electrochemical cell and the second electrochemical cell.

7. The battery module of claim 5, further comprising:
a first end plate;
a second end plate;
a fourth adhesive layer positioned between the first end plate and a third side of the first electrochemical cell, the fourth adhesive layer adhered to the first end plate and the third side; and
a sixth adhesive layer positioned between the second end plate and a fourth side of the second electrochemical cell, the sixth adhesive layer adhered to the second end plate and the fourth side.

8. The battery module of claim 5, further comprising:
a pack base;
a seventh adhesive layer positioned between a first bottom surface of the first electrochemical cell and the pack base, the first adhesive layer adhered to the first bottom surface and the pack base; and
a ninth adhesive layer positioned between a second bottom surface of the second electrochemical cell and the pack base, the second adhesive layer adhered to the second bottom surface and the pack base.

9. The battery module of claim 1, wherein:
the at least one electrochemical cell comprises a first electrochemical cell and a second electrochemical cell;
the first electrochemical cell has a second side and a first bottom surface; and
the second electrochemical cell has a third side and a second bottom surface;
a base plate located beneath the first bottom surface and the second bottom surface, the battery module further comprising:
a frame including a first beam positioned between the first electrochemical cell and the second electrochemical cell and in engagement with the second side and the third side;
a first adhesive portion positioned between the base plate and the first bottom surface; and
a second adhesive portion positioned between the base plate and the second bottom surface.

10. The battery module of claim 9, wherein the first adhesive portion is separated from the second adhesive portion by the first beam.

11. The battery module of claim 10, wherein the frame comprises:
a second beam orthogonal to the first beam;
a third beam opposite the second beam; and
a fourth beam opposite the second beam, such that the first beam, the second beam, the third beam, and the fourth beam define an opening closely conforming to an outer perimeter of the first electrochemical cell, the first adhesive portion located within the opening.

12. The battery module of claim 9, wherein:
the frame further includes at least one first spacer configured to establish a first space between the first bottom surface and the base plate, and at least one second spacer configured to establish a second space between the second bottom surface and the base plate;
the first adhesive portion is positioned in the first space; and
the second adhesive portion is positioned in the second space.

13. The battery module of claim 9, wherein, prior to assembly of the battery module, the first adhesive portion comprises:
a first Y-shape at a first end portion; and
a second Y-shape at a second end portion.

14. The battery module of claim 9, wherein the first adhesive portion is configured as a single strip of adhesive prior to assembly of the battery module.

15. The battery module of claim 9, wherein:
the first bottom surface and the second bottom surface are each circular shaped; and
the first adhesive portion and the second adhesive portion each have a star shape prior to assembly of the battery module.

16. A battery module, comprising:
a first electrochemical cell including a first side and a first bottom surface;
a second electrochemical cell including a second side and a second bottom surface;
a base plate located beneath the first bottom surface and the second bottom surface;
a frame including a beam positioned between the first electrochemical cell and the second electrochemical cell and in engagement with the first side and the second side;
a first adhesive portion positioned between the base plate and the first bottom surface; and
a second adhesive portion positioned between the base plate and the second bottom surface.

17. The battery module of claim 16, wherein:
the frame further includes at least one first spacer configured to establish a first space between the first bottom surface and the base plate, and at least one second spacer configured to establish a second space between the second bottom surface and the base plate;
the first adhesive portion is positioned in the first space; and
the second adhesive portion is positioned in the second space.

18. The battery module of claim 16, wherein, prior to assembly of the battery module, the first adhesive portion comprises:
a first Y-shape at a first end portion; and
a second Y-shape at a second end portion.

19. The battery module of claim 16, wherein the first adhesive portion is configured as a single strip of adhesive prior to assembly of the battery module.

20. The battery module of claim 16, wherein:
the first bottom surface and the second bottom surface are each circular shaped; and
the first adhesive portion and the second adhesive portion each have a star shape prior to assembly of the battery module.

* * * * *